United States Patent Office 2,774,363
Patented Dec. 18, 1956

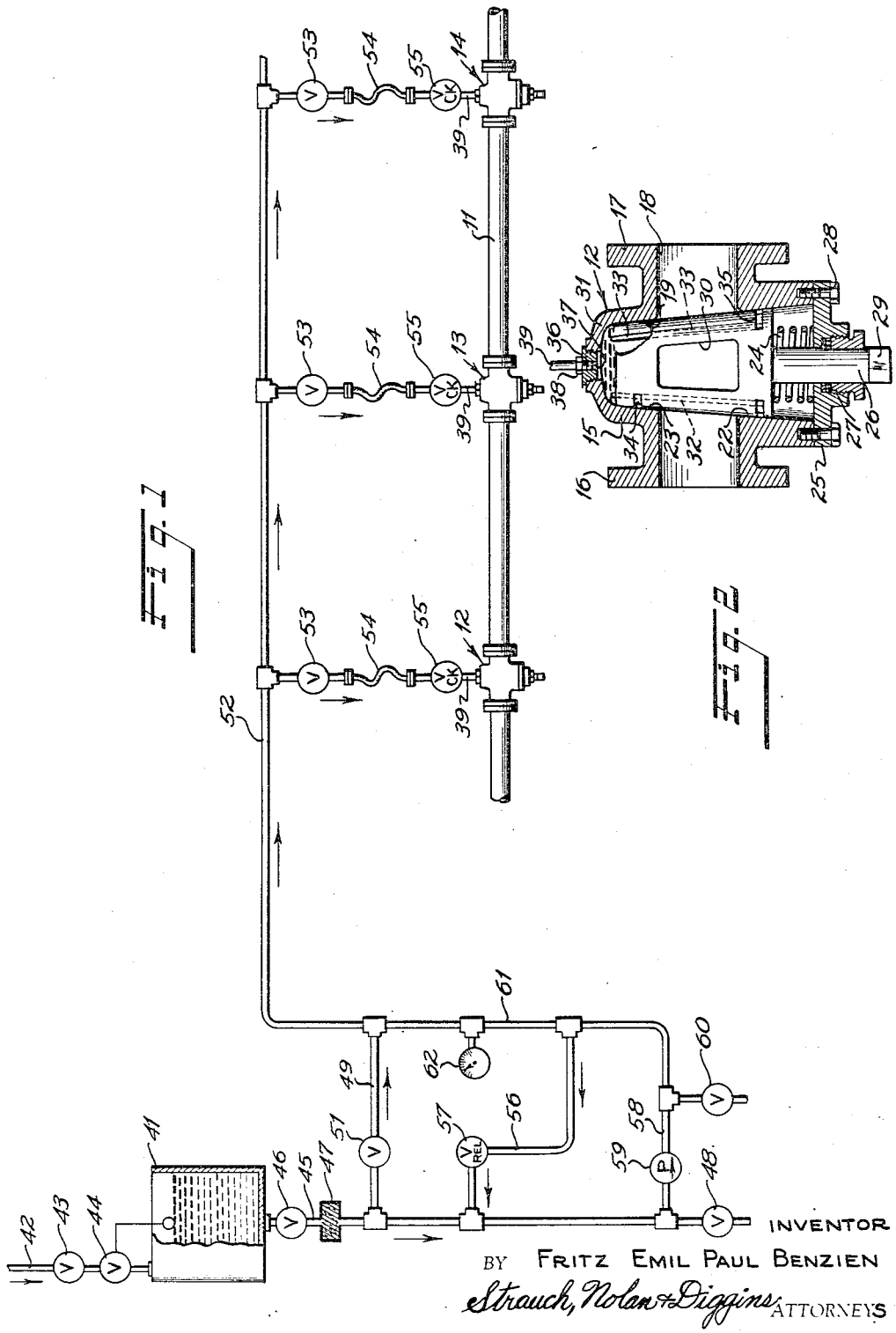

2,774,363

VALVE OPERATION

Fritz Emil Paul Benzien, South Orange, N. J., assignor to Colgate-Palmolive Company, a corporation of Delaware Application February 28, 1952, Serial No. 273,982

9 Claims. (Cl. 137—1)

This invention relates to a system for maintaining operation of a plug valve or valves in a pipe line for conducting flowable materials that might crystallize, cake or otherwise freeze the plug as during a shutdown period.

In its preferred embodiment, the invention will be described as applied to plug valves in a pipe line in a soap or detergent manufacturing apparatus wherein the line conducts caustic lye or other liquid components of the soap or detergent that may tend to cake or crystallize within the line. Considerable difficulty has been encountered after an appreciable shutdown period in turning these valve plugs, even where the so-called lubricated plug cock type of valve wherein the plug is jacked from its seat under lubricant pressure is employed. Experience has shown that very often the crystallization or caking resulting in freezing of the plug progresses to such an extent even over a week-end shutdown of the soap line that considerable mechanical force is required to turn the plug, often resulting in damage to the body or plug, and the conventional jacking action is usually not enough to secure the necessary clearance between the plug and the body for turning the plug. Another disadvantage of the conventional lubricant jacked type of plug is that during the turning movement between fully open and fully closed positions the lubricant in the plug grooves is washed out by the line fluid thereby contaminating the soap line which must be held to very high standard of purity to meet specifications in the industry.

According to the present invention, although I preferably use a valve which has substantially the internal structure of the usual lubricated plug cock, I entirely eliminate the usual lubricant therefrom and provide means to distribute water or another liquid through the seating or sealing surfaces of the valve plug and keep those surfaces moist so that a small amount of the liquid is always present at the inner edges of the valve port where closed by the plug. I have found that this exerts sufficient solvent action on the material in the line to prevent crystallization and keep the plug from freezing. The invention will therefore be described as supplied to such a line, it being understood that it is independent of the particular internal structure of the plug valve except for the provision of passages therein necessary to supply the water or other solvent liquid to the seating surfaces. The preferred liquid is water which is an excellent solvent for most of the materials carried in these lines.

I retain the jacking function of the usual plug valve assembly by providing in the water line a normally bypassed pumping device which can be manually inserted into the line for exerting a considerable hydraulic lifting presure on the plug for unseating it should this be required. Therefore my assembly will provide a soap making apparatus line with such improvement that it retains all of the advantages of the normal lubricated plug cock line with elimination of all the disadvantages which are described above.

It is therefore a major object of my invention to provide a novel system for maintaining a non-lubricated plug cock in a line free for turning.

A further object of the invention is to provide such a system wherein provision is also made for jacking the plug from its seat.

A further object of my invention is to provide a system for maintaining several plug cocks in a line free for turning and containing a normally by-passed device that is operable at will to jack any one of the plugs individually or together from its seat.

It is a further object of my invention to provide a novel plug cock conditioning system whereby a liquid such as water continuously moistens the contacting surfaces of the plug and valve body whereby crystallization of materials passing through the line is eliminated at the valve.

It is a further object of my invention to provide a novel plug cock conditioning system wherein water or a like liquid under pressure is supplied under constant pressure to maintain the sealing surfaces between the valve plug and body against freezing due to deposits of line material.

Further objects of the invention will appear as the description proceeds in connection with the appended claims and the annexed claims wherein:

Figure 1 is a schematic view of a system according to a preferred embodiment of the invention; and Figure 2 is an enlarged view more or less schematically illustrating a plug construction as used in the invention.

Referring to Figure 1, the soap making apparatus includes a pipe line indicated at 11 which contains at different points a series of plug cocks 12, 13 and 14 that vary in number according to the size of the installation. The line 11, for example, may be a line for carrying lye to a soap kettle, or for conveying any other material which may tend to crystallize in the line and freeze the plugs.

Referring to Figure 2, one of these plug valves, which is exemplary of the structure of any of them, is disclosed in detail. The valve body 15 contains end flanges 16 and 17 for coupling it into the line and has a through port 18. At right angles to the through port 18 is a tapered bore 19 in which is seated a rotatable plug 21, the two being in what amounts to a step bearing engagement at spaced annular sealing surfaces indicated at 22 and 23. The valve plug is urged onto its seat as by a spring 24 reacting between the plug and a cover member 25 through which extends the stem 26, a packing 27 being provided to prevent leakage along this stem. The cover 25 is removably secured to the body as by screws 28 and the stem is provided with a portion 29 adapted to receive a wrench for turning the plug about its axis. While a tapered plug is illustrated the invention can be used in cylindrical and other shaped plug valves.

At the small end of the plug, there is a chamber 31 between the plug and the body. This chamber is that which normally contains lubricant in this type of lubricated plug cock, and communication between this space and the annular seating surfaces 22 and 23 between the plug and body is provided by a conventional system of longitudinal grooves 32 and 33 and annular grooves 34 and 35 which cooperate with suitable grooves in the body surface for insuring that the reservoir 31 is connected to the longitudinal grooves of the body surface only when the plug is in the fully open or closed positions. Such is conventional plug valve grooving. When the plug is rotated 90° with respect to its Figure 2 position its through port 30 is aligned with port 18 and the valve is fully open.

A threaded closure member 36 closes the top of reservoir 31 and is provided with a bore 37 communicating with reservoir 31. Bore 37 has mounted in it a fitting 38 for coupling thereto a pipe line 39 for introducing water or other desired solvent liquid under pressure into the valve assembly.

Referring back to Figure 1, the arrangement for applying water to the plug valves is there illustrated. A tank 41 is provided with an upper inlet pipe 42 that is connected to a source of city water. This pipe 42 contains a manual shut-off valve 43 that is normally open and a float valve 44 which cuts off whenever water in tank 41 reaches a predetermined level, so that a constant head is maintained upon the outlet conduit 45 from tank 41. Below the tank outlet conduit 45, which is connected to the lowest part of the tank to take advantage of maximum head, is a manual shut-off valve 46, a strainer 47 and a normally closed drain valve 48. The main line comprises a pipe 49 which is connected into conduit 45 just below the strainer and above the drain valve, and this line contains the normally open valve 51.

Pipe 49 is then connected to a header 52 which in turn is connected to all of the lines 39 leading to the plug cocks 12, 13 and 14. Each line 39 contains in order a manually operable valve 53, a length of flexible hose 54 made of brass or the like, the purpose of which will presently appear, and a check valve 55 which insures against fluid from the line 11 backing up into the water line.

In a system where city water is supplied to tank 41, I prefer to maintain a head of about six feet of water between the top level of the water in tank 41 and the line 11, but of course any suitable head can be selected to accommodate the problem or the installation.

Below the connection of lines 49 and 45, a branch passage 56 is provided parallel to main line 49. This passage contains a relief valve 57 and its purpose is to relieve excessive pressures existing in the system under certain conditions and prevent them from being applied to the plug cock. For instance, in the illustrated example, I have provided a relief valve at 57 which will open when the pressure is about 180 pounds per square inch in the system and permit a return flow to conduit 45. The function of relief valve 57 is to coact with the pump actuated jacking system for the plug cock which will now be described. A drain valve 60 is provided in the pump line, and a pressure gauge 62 is installed in riser 61.

Above the drain valve 48 and below the connection of branch 56 to line 45 is connected a line 58 containing a pump 59 which is connected to the bottom of the riser 61 leading to header 52. When abnormally high pressure is developed in the riser 61 during operation of pump 59 the relief valve 57 will crack open and connect the pump outlet back into the line 45.

In normal operation, the water in the tank 41 acting through lines 45 and 49, riser 61 and header 52 and all of the lines 39 (all valves 53 being open) is forced into the valve seat clearance spaces at 22 and 23. This keeps those surfaces moistened, particularly at the edges of the valve ports, so that there will be little or no crystallization of the line material and the plugs will usually be free to be rotated at any time.

However, should one or any of the plugs become frozen, the system can be employed to exert a jacking pressure upon any one or all of them. In order to do this, the valve 51 is closed and only the valve 53 leading to whichever of the plugs that is to be jacked is left open. If only one of the plugs is frozen, the other valves 53 can be closed so that they are not affected by the pumping operation to be described. When the pump 59, which normally acts as a valve holding back flow of liquid through line 58, is placed in operation to thereby develop a fluid pressure in riser 61 and header 52, the relief valve 57 will prevent return flow through lines 56 and the closed valve 51 will prevent return of fluid through line 49, so that developed pressure in the riser, header and line 39 will increase the fluid pressure in reservoir 31 thereby urging the valve plug away from its seat against the resistance of spring 24. This permits an abundance of water to enter the spaces 22 and 23 to dissolve any crystallization there and it permits the plug to be readily turned. I have thus provided a selective arrangement for jacking one or all or any combination of the plugs from its seat at any one time.

Under normal conditions there will always be a head of water constantly tending to seep through the bearing spaces at 22 and 23 toward the valve port. Furthermore this water pressure providing such a slight inward fluid flow about the valve port overcomes the line pressure and insures that there is no leakage of the caustic past the upstream port of the valve and thus provides a sealing action like the usual lubricated plug valve. When the line is shut down and the plug valves are closed, this small flow prevents crystallization about the plug. Valves 53 can be closed during the week when there are no shut downs, but even if accidentally left open the small amount of water that may continuously enter the soap line is negligible. The flexible pipes 54 absorb any pump vibration water hammer shocks when the pump 59 is in operation.

My invention thus obtains all of the benefits of the usual lubricated plug valve equipped apparatus without any of its disadvantages. Once the initial installation has been made, the expense of operation is usually only that of the water, which is negligible, and some servicing of the valve. The cost of lubricant is eliminated and the danger of contamination of the line through lubricant washed out of the valve surface grooves 21 and 22 is entirely eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a valve body adapted to be mounted in a pipe line and a plug rotatable upon a seating surface in said body, means for introducing a solvent liquid other than line fluid into the space between said plug and body at said surface in both open and closed positions of the plug, and means for maintaining said solvent liquid under sufficient substantially constant pressure that said solvent liquid continuously seeps through said space to constantly moisten said surface and prevent such crystallization or caking of the line fluid as might freeze the plug in the body.

2. In a system having a fluid conducting line containing a plug cock comprising a valve body and a tapered valve plug rotatable on seating surfaces in said body, a chamber in said body at the small end of the plug, means providing at least one communicating passage between said chamber and the space between said surfaces, a conduit leading a solvent liquid into said chamber, and means for maintaining a sufficient constant pressure on said solvent liquid that said solvent liquid constantly seeps through said space between said seating surfaces to maintain them continuously moist and resistant to crystallization or caking of the line fluid in all positions of rotation of the plug.

3. In a flow control system, a plug valve body and a plug rotatable therein, means for supplying a solvent liquid under sufficient constant pressure to substantially seep through the space between the seating surfaces of the plug and body, and additional means for selectively materially increasing the pressure of said solvent liquid for jacking the plug from its normal seated relation in said body.

4. In a flow control system, a valve body, a plug valve rotatable therein, a conduit for introducing a solvent liquid to the seating surfaces between the plug and body, means for maintaining a constant pressure and uniform small flow of solvent liquid through said conduit, a pump, and means for introducing said pump into said system to materially increase the pressure on the solvent liquid introduced into said valve for jacking the plug from its seat.

5. In the system defined in claim 4, a check valved connection to said conduit for relieving excess pump pressure in said conduit.

6. The method of maintaining a rotatable plug valve against freezing due to crystallization or caking of line fluid during periods when the valve is closed which comprises introducing into the space between the seating surfaces of the plug and valve body a solvent liquid for crystallized or caked line fluid material under sufficient substantially constant pressure for continuously seeping said solvent liquid through said space for maintaining said surfaces constantly moistened.

7. In a flow control system, a pipe line containing a valve body and a plug rotatable in said body, a main conduit for a solvent liquid, means maintaining said liquid under constant pressure, liquid distribution passages in said valve connected to said main conduit for delivering said liquid to the plug seating surfaces, a bypass conduit for a portion of said main conduit containing a pump, a valve in said portion of the main conduit adapted to be closed when the pump is actuated to increase the delivery pressure of said main conduit, and a pressure relief valved conduit effectively parallel to the bypass conduit adapted to relieve the pump developed pressure in the main conduit when it exceeds a predetermined amount.

8. In a flow control system, a pipe line containing a series of valve assemblies each comprising a valve body containing a rotatable plug, a main conduit for a solvent liquid, a plurality of branch conduits between said main conduit and the interior of said valve assemblies for supplying said solvent liquid to the associated seating surfaces of each plug and body, means for maintaining a constant small head on said solvent liquid in the said conduits, means for selectively multiplying the pressure on the solvent liquid in said conduits sufficiently to jack the plugs from their seats, and a valve in each branch conduit for selectively connecting it to said main conduit.

9. In a system having a fluid conducting line containing a plug cock comprising a valve body and a tapered valve plug rotatable on seating surfaces in said body, a chamber in said body at the small end of said plug, a conduit leading a solvent liquid into said chamber, means for maintaining a constant head on said solvent liquid whereby said solvent liquid will be constantly urged between said seating surfaces to maintain them moist and resistant to crystallization or caking of the line fluid in all positions of rotation of the plug, and means for optionally developing a higher pressure in said conduit and said chamber for jacking the plug from its seat.

References Cited in the file of this patent

UNITED STATES PATENTS

| | | |
|---|---|---|
| 1,440,083 | Jacobsen | Dec. 26, 1922 |
| 1,696,726 | Nordstrom | Dec. 25, 1928 |
| 1,821,929 | Cornner | Sept. 8, 1931 |
| 1,944,995 | Nordstrom | Jan. 30, 1934 |
| 1,998,029 | Simpson | Apr. 16, 1935 |
| 2,029,777 | Kinnaird | Feb. 4, 1936 |
| 2,070,490 | Nordstrom | Feb. 9, 1937 |
| 2,305,724 | Luetzelschwab | Dec. 22, 1942 |
| 2,315,058 | Holt | Mar. 30, 1943 |
| 2,389,670 | Kerr | Nov. 27, 1945 |
| 2,630,293 | Smith | Mar. 3, 1953 |

FOREIGN PATENTS

| | | |
|---|---|---|
| 177,479 | Switzerland | of 1935 |
| 541,695 | Germany | Jan. 14, 1932 |